Figure 1:
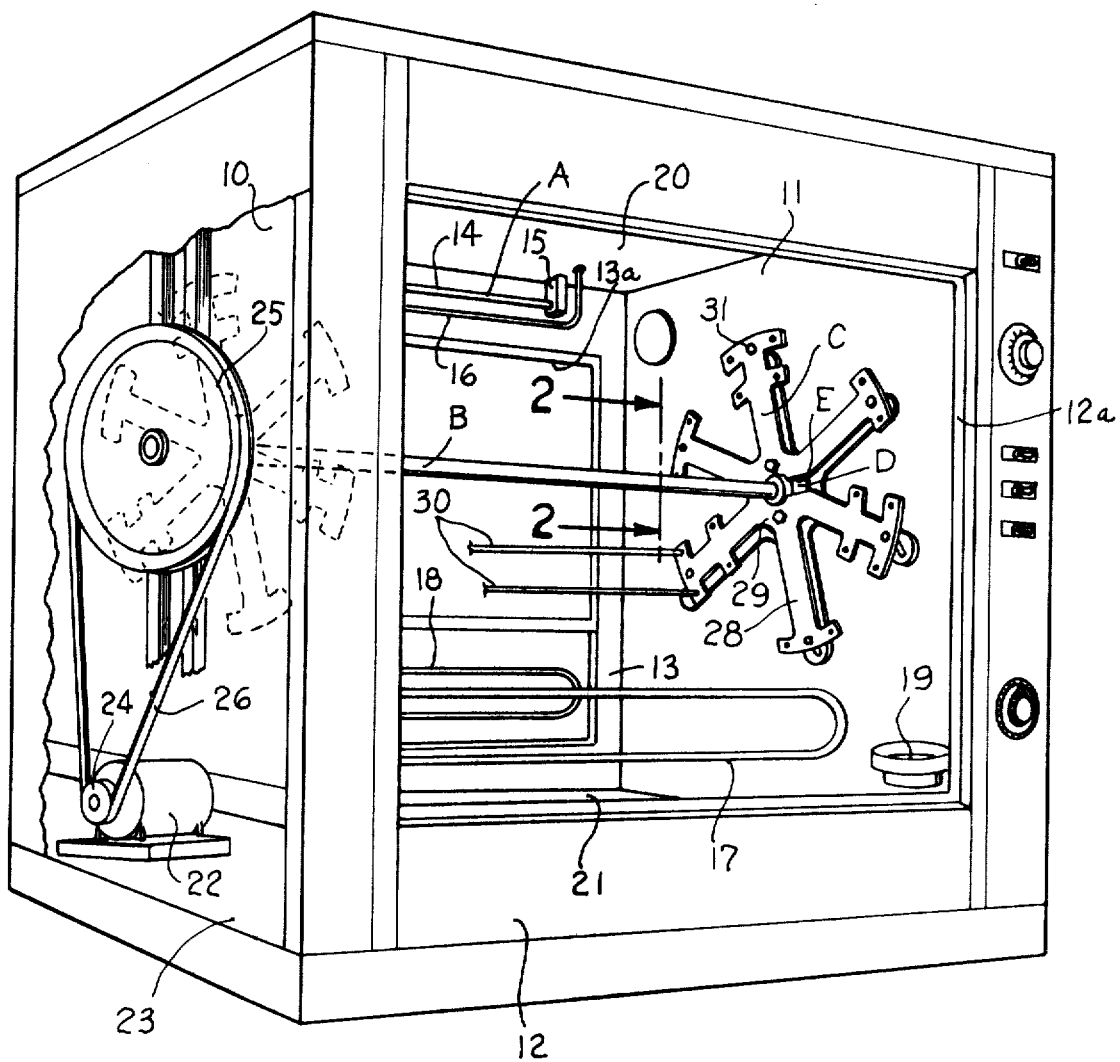

United States Patent

Wilson

[15] 3,706,272
[45] Dec. 19, 1972

[54] BARBECUE MACHINE EDIBLE CARRIER ASSEMBLY

[72] Inventor: Robert G. Wilson, 165 Faris Circle, Greenville, S.C. 29605

[22] Filed: April 26, 1971

[21] Appl. No.: 137,224

[52] U.S. Cl. ..................99/340, 99/261, 99/421 P
[51] Int. Cl. ..............................A47j 37/04
[58] Field of Search........99/340, 339, 259, 260, 261, 99/421 P; 107/59; 287/52.04, 52.07

[56] References Cited

UNITED STATES PATENTS

| | | | |
|---|---|---|---|
| 3,333,529 | 8/1967 | Wilson | 99/339 |
| 530,282 | 12/1894 | Lorah | 287/52.04 |
| 3,379,119 | 4/1968 | Harrill | 99/421 H |
| 816,117 | 3/1906 | Nelson | 287/52.04 X |
| 483,227 | 9/1892 | Little | 287/52.04 X |
| 3,205,812 | 9/1965 | Booth | 99/421 P |
| 2,722,882 | 11/1955 | Wilson | 99/259 X |

Primary Examiner—Billy J. Wilhite
Assistant Examiner—Arthur O. Henderson
Attorney—Bailey and Dority

[57] ABSTRACT

An improved edible carrier assembly for barbecue machines and the like, includes a central driven shaft having a support positioned upon the shaft adjacent each end thereof for positioning edible supporting means therebetween, and a channel within each of said supports extending radially from the shaft so that the supports may be removed therefrom allowing free access for cleaning the supports and adjacent surfaces.

2 Claims, 5 Drawing Figures

PATENTED DEC 19 1972 3,706,272

SHEET 1 OF 2

INVENTOR.
ROBERT G. WILSON
BY
Bailey & Dority
ATTORNEYS.

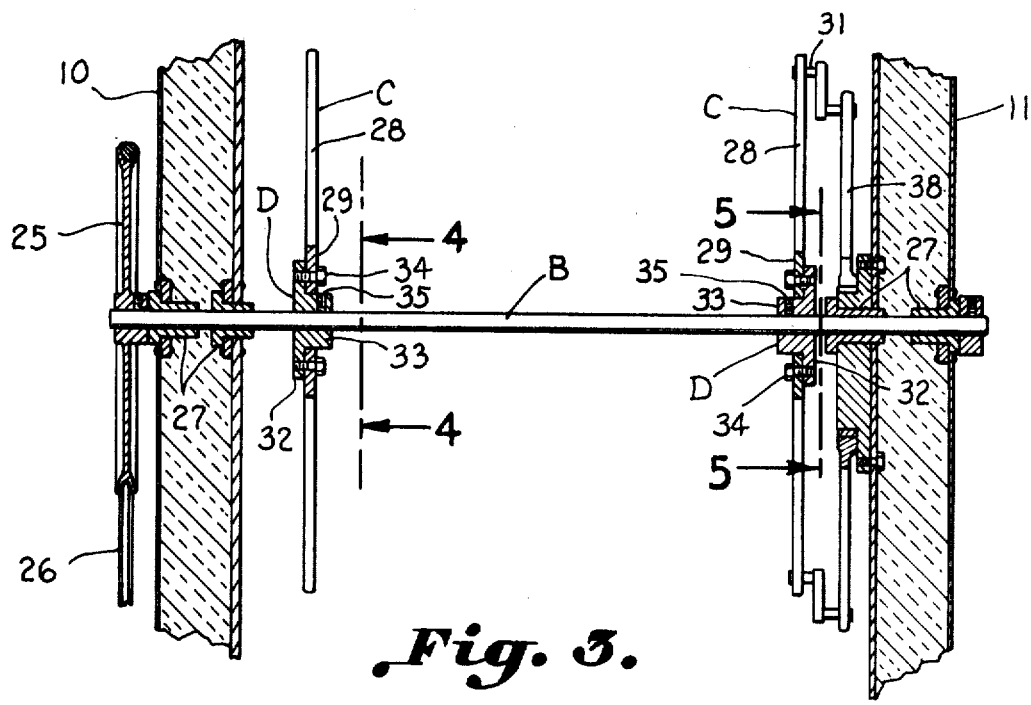
Fig. 3.
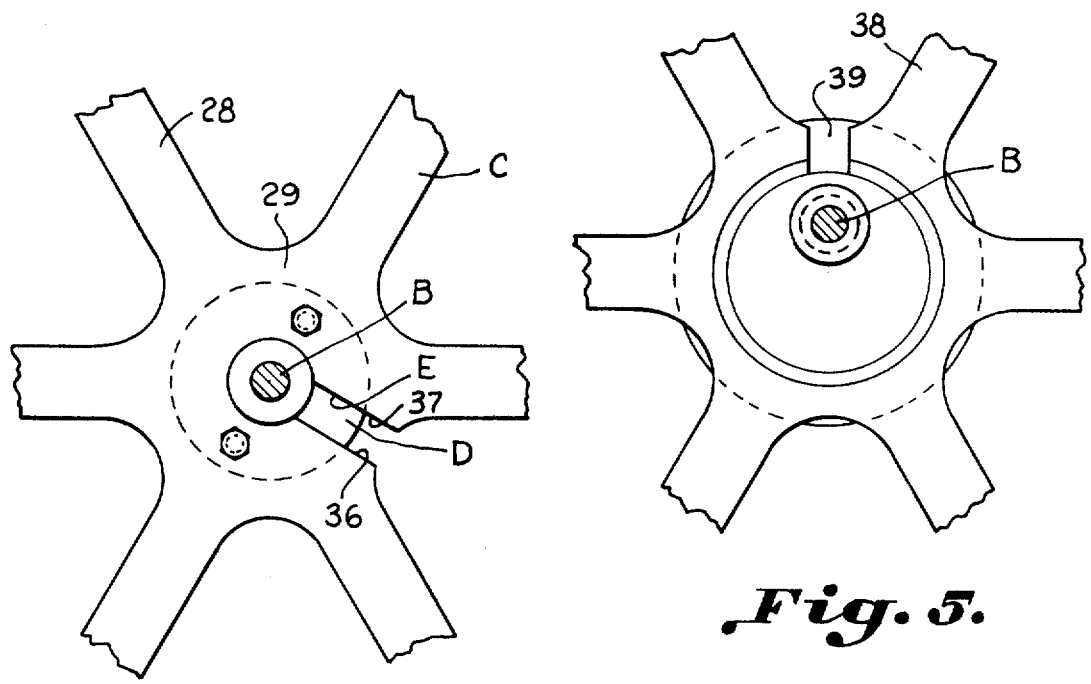
Fig. 4.
Fig. 5.

BARBECUE MACHINE EDIBLE CARRIER ASSEMBLY

This invention relates to an improved edible carrier assembly wherein the supports for positioning edible supporting means therebetween are removable, permitting cleaning of the supports and adjacent oven areas.

Electrically operated commercial barbecue machines of the type often employed in supermarkets and restaurants have assemblies for carrying meat, pies and other edibles within the oven which include spaced supports for carrying spits, trays, and the like therebetween. While the spits, trays and the like are removable, the remainder of the assembly is not readily removable from the oven and, in fact, such would require a substantial disassembly of the machine. A typical driven edible carrier assembly as formerly used is illustrated in U.S. Pat. No. 3,232,247 issued Feb. 1, 1966. The invention is illustrated in connection with an assembly substantially as illustrated in the aforesaid patent.

Accordingly, an important object of this invention is to provide an improved edible carrier assembly, a substantial portion of which may be removed from the oven to facilitate cleaning of the assembly and adjacent oven areas.

The invention contemplates a channel in each of the spaced supports larger than the diameter of the driven shaft extending radially therefrom, and means for fixing the supports to an adjacent hub for removal from the oven by freeing the support and removing same from the shaft by virtue of the channels in the supports.

The construction designed to carry out the invention will be hereinafter described, together with other features thereof.

Figure 2:
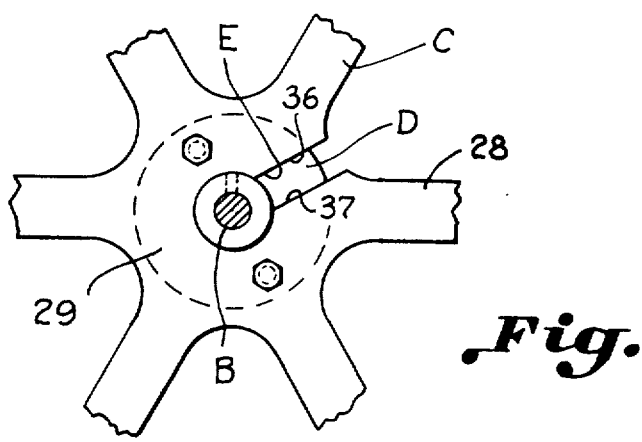

The invention will be more readily understood from a reading of the following specification and by reference to the accompanying drawings forming a part thereof, wherein an example of the invention is shown and wherein FIG. 1 is a perspective view illustrating a barbecue machine having an edible carrier assembly constructed in accordance with the present invention, FIG. 2 is a transverse sectional elevation taken on the line 2—2 in FIG. 1, FIG. 3 is a longitudinal sectional elevation illustrating the improved edible carrier assembly, and co-operating parts, FIG. 4 is a transverse sectional elevation taken on the line 4—4 in FIG. 3, and FIG. 5 is a transverse sectional elevation taken on the line 5—5 in FIG. 3.

The drawings illustrate an improved edible carrier assembly for use in a barbecue machine and the like having an oven defined by walls with internal oven surfaces. A source of heat A is carried within the oven, and an edible carrier assembly is driven for rotation within the oven. The carrier assembly includes a central driven shaft B journalled in opposing walls. A support C is positioned upon the shaft adjacent each end thereof for positioning edible supporting means therebetween in circumferentially spaced relation to each other and peripherally spaced to the shaft. A hub portion D is carried by said shaft adjacent each end thereof carrying said supports thereon. Means are provided for fixing the hub portions to the shaft. A pair of opposed side walls within each of said supports extending radially from the shaft define a channel E larger than the diameter of the shaft. The channels extend through each of the supports so that the supports may be removed from the shaft allowing free access for cleaning adjacent oven surfaces as well as the supports.

The oven of the barbecue machine includes side walls 10 and 11 and front and rear walls 12 and 13, respectively (FIG. 1). The source of heat A may include Calrod units and the like, illustrated at 14, carried by suitable supports 15. If desired, a guard 16 may be provided to prevent accidental contact therewith. Also, if desired, additional heating units 17 and 18 may be provided. A small heating element is illustrated at 19 for causing seasoning means, such as a piece of hickory wood to smolder. The source of heat A is illustrated as being carried by the top of the oven 20, while the bottom 21 carries suitable means for draining grease and the like (not illustrated). The front and rear walls 12 and 13 include doors 12a and 13a, respectively.

The edible carrier assembly is driven for rotation by a motor 22 carried within a compartment 23 beside the oven previously described. The motor 22 has a power take-off pulley 24 which drives the pulley 25, carried adjacent one end of the assembly shaft B through the belt 26.

As stated above, the edible carrier assembly is of the type illustrated in the aforesaid patent so that it is not deemed necessary to described in detail the components thereof with which the invention is not directly concerned. Referring especially to FIG. 3, it will be noted that the shaft B is carried for rotation within suitable bearings 27 carried within the insulated walls 10 and 11. The oven supports C are illustrated as having arms 28 carried by central hub portions 29. The arms accommodate spits such as illustrated at 30, or stub shafts 31 may position trays not shown here, but which are illustrated in the aforesaid patent.

The hubs D each include a radial flange 32 carried by a boss portion 33. The supports C are releasably fixed to respective hubs D by the bolts 34. Set-screws 35 fix the hub portions to the shaft.

The channels E are each defined by opposed side walls 36 and 37 which are sufficiently larger than the diameter of the shaft so that the supports may be passed thereover with the channels accommodating the shaft which is passed therethrough when removing the supports.

It may be readily observed that the spits 30 or trays may be first removed and then the support C may be released from the hubs for removal from the oven. This makes it possible to have good access to adjacent portions of the oven walls while the supports may be cleaned as in a sink. The hub portion may be an integral part of the support and the channel could extend therethrough to permit removal thereof from the oven. In the embodiment illustrated the operating mechanism 38 is provided with a channel 39 so that it may also be removed from the shaft for cleaning.

While a preferred embodiment of the invention has been described using specific terms, such description is for illustrative purposes only, and it is to be understood that changes and variations may be made without departing from the spirit or scope of the following claims.

What is claimed is:

1. For use in a barbecue machine and the like having an oven defined by walls with internal oven surfaces, a source of heat within the oven, and an edible carrier assembly driven for rotation within the oven, said carrier assembly comprising: a central driven shaft journalled in opposing walls; a support positioned upon said shaft adjacent each end thereof for positioning edible supporting means therebetween in circumferentially spaced relation to each other and peripherally spaced to said shaft; a hub portion carried by said shaft adjacent each end thereof carrying said supports thereon; means fixing said hub portions to said shaft; a pair of opposed side walls within each of said supports extending outwardly from said shaft defining a channel larger than the diameter of said shaft; and said channels extending through each of said supports permitting passage of said shaft therethrough; whereby said supports may be removed from the shaft allowing free access for cleaning adjacent oven surfaces as well as the supports.

2. The structure set forth in claim 1, wherein said supports are releasably fixed to respective hub portions.

* * * * *